United States Patent
Saygan et al.

(10) Patent No.: US 6,702,136 B2
(45) Date of Patent: Mar. 9, 2004

(54) BRAKE FLUID RESERVOIR CAP ASSEMBLY DESIGN

(75) Inventors: Miguel Saygan, Troy, MI (US); Jim Tottingham, Ortonville, MI (US); Dennis Downen, Berkley, MI (US); Dale May, Madison Heights, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 53 days.

(21) Appl. No.: 10/154,626

(22) Filed: May 24, 2002

(65) Prior Publication Data

US 2003/0217988 A1 Nov. 27, 2003

(51) Int. Cl.⁷ .............................. B65D 51/16; F15B 7/10
(52) U.S. Cl. .............................. 220/203.17; 220/203.18; 220/203.19; 220/212; 220/368; 220/795; 60/583; 60/585; 60/592; 137/859; 92/142
(58) Field of Search ....................... 220/203.17, 203.18, 220/203.19, 212, 304, DIG. 32, 368, 795; 215/310, 341, 350, 351; 137/859; 60/582, 583, 585; 92/104, 142

(56) References Cited

U.S. PATENT DOCUMENTS

| | | | | |
|---|---|---|---|---|
| 3,527,376 A | * | 9/1970 | Young, Jr. ............. | 220/203.17 |
| 3,977,105 A | * | 8/1976 | Tsubouchi ............. | 40/628 |
| 4,261,475 A | * | 4/1981 | Babiol ................. | 215/341 |
| 4,307,815 A | * | 12/1981 | Sakazume ............. | 220/721 |
| 4,393,655 A | * | 7/1983 | Komorizono .......... | 60/585 |
| 4,658,585 A | * | 4/1987 | Kamemoto et al. ..... | 60/592 |
| 4,987,740 A | * | 1/1991 | Coleman ............... | 60/583 |
| 5,025,628 A | * | 6/1991 | Layman et al. ........ | 60/585 |
| 5,072,844 A | | 12/1991 | Nakano et al. | |
| 5,136,847 A | * | 8/1992 | Zander et al. ......... | 60/585 |
| 5,269,431 A | * | 12/1993 | Sakata et al. .......... | 220/203.17 |
| 5,347,813 A | * | 9/1994 | Yanagi et al. .......... | 60/585 |
| 6,360,540 B1 | * | 3/2002 | Kottmyer .............. | 60/585 |
| 6,446,880 B1 | * | 9/2002 | Schram et al. ......... | 239/145 |

* cited by examiner

*Primary Examiner*—Lee Young
*Assistant Examiner*—James Smalley

(57) ABSTRACT

The present invention is an improved reservoir cap for a braking fluid reservoir including a cylindrical skirt for surrounding an opening of the reservoir body, a disc portion having a hard stop formed unitarily with the cylindrical skirt for closing the reservoir fill opening, and a plurality of teeth formed unitarily about the hard stop for securing an elastic member. The elastic member is disposed about the teeth of the reservoir cap and secured thereto. The elastic member defines ridges disposed circumferentially about its center. Between the ridges and the center of the elastic member is a channel, which in turn defines a pair of openings which permit the flow of excess fluid through the elastic member, thereby reducing the possibility of fluid overflow, and thus preventing excess brake fluid from permeating the reservoir cap and leaking into the engine compartment of a vehicle.

14 Claims, 2 Drawing Sheets

BRAKE FLUID RESERVOIR CAP ASSEMBLY DESIGN

BACKGROUND AND SUMMARY OF THE INVENTION

The present invention relates to a reservoir cap, and more particularly to a reservoir cap for a motor vehicle hydraulic brake fluid reservoir adapted for minimizing the loss of fluid from the reservoir.

A conventional brake fluid reservoir cap of this kind generally comprises a cap having an inner membrane or elastic member within for containing a fluid within a fluid reservoir. The typical reservoir cap provides a venting slit whereby fluid may escape the reservoir, requiring more frequent changes of fluid and decreasing the efficiency of braking.

The present invention is an improved reservoir cap for a braking fluid reservoir including a cylindrical skirt for surrounding an opening of the reservoir body, a disc portion having a hard stop formed unitarily with the cylindrical skirt for closing the reservoir fill opening, and a plurality of teeth disposed about the hard stop and formed unitarily with the disc portion for securing an elastic member. The elastic member is disposed about the teeth of the reservoir cap and secured thereto. The elastic member defines ridges disposed circumferentially about its center. Between the ridges and the center of the elastic member is a channel, which in turn defines a pair of openings which permit the flow of excess fluid through the elastic member. The orientation and location of the openings of the elastic member in accordance with this invention reduces the possibility of fluid overflow, and thus prevents excess brake fluid from permeating the reservoir cap and leaking into the engine compartment of a vehicle.

DETAILED DESCRIPTION OF THE INVENTION

Figure 1:
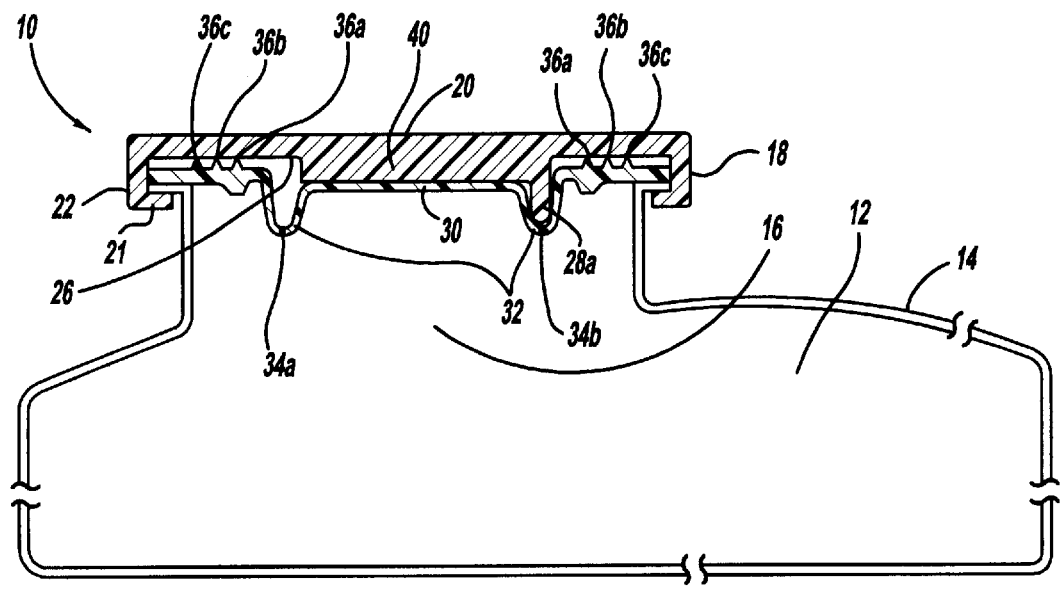
FIG. 1 is a cross sectional view of the reservoir cap of the present invention.

In accordance with the preferred embodiment of the present invention, FIG. 1 is a cross sectional view of the reservoir cap assembly 10 of the present invention. A fluid reservoir 12 is depicted having a surface 14 for containing fluid (not shown) and an opening portion 16 for the deposit or removal of the fluid. Unintentional leakage of the fluid from the fluid reservoir is mitigated through the use of a reservoir cap 18, which is disposed about the opening portion 16 of the fluid reservoir 12 and selectively coupled to the fluid reservoir 12 by an engaging member 21.

The reservoir cap 18 comprises a disc portion 20 that is unitarily formed with a cylindrical skirt 22 about its circumference. The disc portion 20 defines a venting groove 24 through which air may pass from outside the reservoir to its interior, permitting the fluid to be exposed to ambient air. The venting groove 24 also permits fluid to escape from the reservoir 12, an event that the present invention aims to mitigate.

The reservoir cap 18 also defines an inner surface 26 that faces the interior of the fluid reservoir 12. The inner surface 26 is unitarily formed with a plurality of teeth 28a, 28b, 28c. The inner surface 26 also defines a hard stop 40, which is bounded by the plurality of teeth 28a, 28b, 28c.

Figure 2:
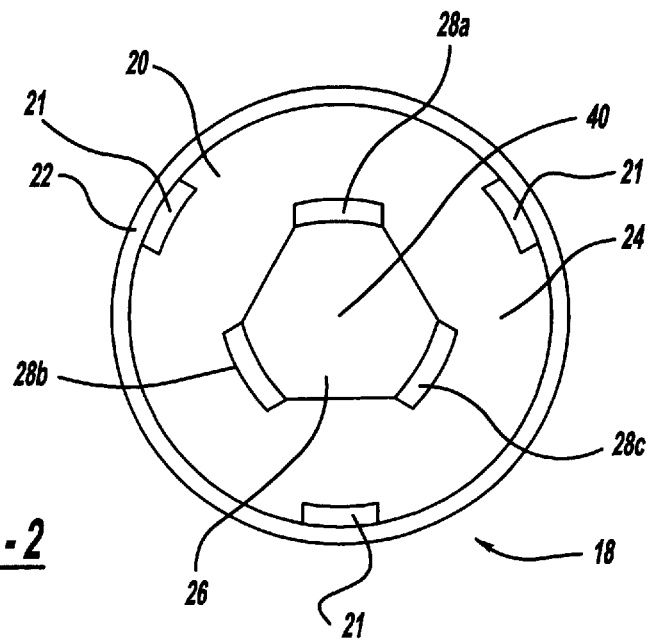
FIG. 2 is an elevated view of the reservoir cap depicting the inner surface and the teeth thereof.

FIG. 2 is an elevated view of the reservoir cap 18. As shown, the inner surface 26 is bounded circumferentially by the cylindrical skirt 22. Disposed about the hard stop 40 of the inner surface 26 are the teeth 28a, 28b, 28c. In the preferred embodiment, the hard stop 40 is hexagonal in nature such that the plurality of teeth 28a, 28b, 28c are disposed in a triangular fashion about the hard stop 40. In the preferred embodiment, three teeth are oriented uniformly such that the teeth describe an equilateral triangle about the hard stop 40 of the inner surface 26.

An elastic member 30 or membrane is disposed between the opening portion 16 and the inner surface 26 as shown in FIG. 1. The elastic member 30 defines a circular channel 32, which is disposed circumferentially about the center 42 of the elastic member 30. The channel 32 defines a pair of openings 34a, 34b disposed at opposing ends of the circular figure of the channel 32. In the preferred embodiment, the openings 34a, 34b are disposed approximately 180 degrees from one another. Alternatively, the openings 34a, 34b may be disposed at other intervals throughout the channel 30. Moreover, although the preferred embodiment depicts a pair of openings, it is understood that more than two openings may be utilized to conduct the flow of reservoir fluid. The elastic member 30 integrally defines ridges 36a, 36b, 36c disposed about the center 42 of the elastic member 30.

Figure 3:
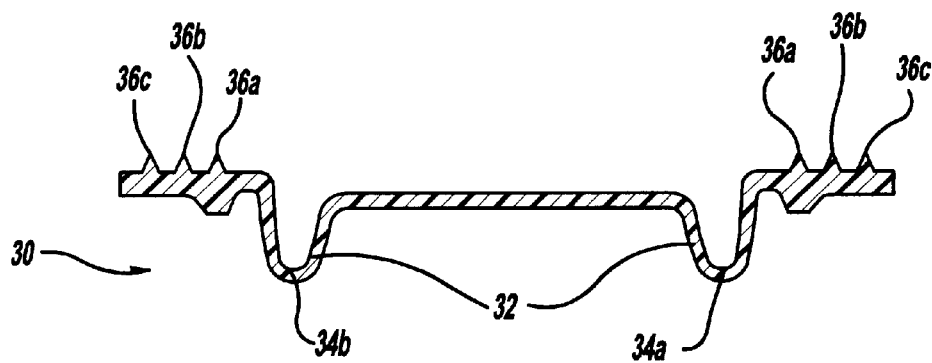
FIG. 3 is a cross sectional view of the elastic membrane depicting the channel and the ridges.

FIG. 3 is a cross sectional view of the elastic member 30 showing the channel 32 disposed about the center 42. The openings 34a, 34b are defined by channel 32 for the purpose of permitting the flow of reservoir fluid. Although three ridges 36a, 36b, 36c are shown in the preferred embodiment, alternative embodiments exist in which the ridges are greater or fewer in number. Moreover, as shown, the ridges 36a, 36b, 36c are disposed uniformly about the center 42. However, in alternative embodiments, the spacing between the ridges 36a, 36b, 36c need not be uniform.

Figure 4:
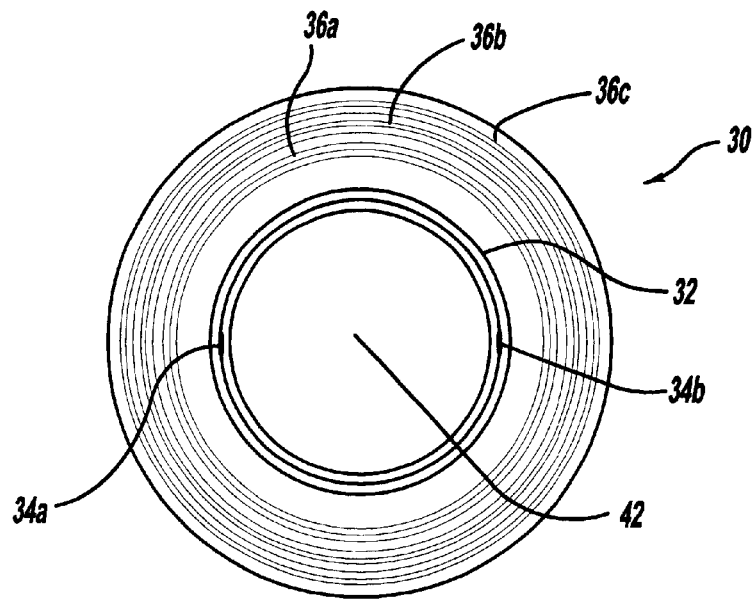
FIG. 4 is an elevated view of the elastic membrane depicting the channel, the ridges, and the orientation of the openings in the channel.

FIG. 4 is an elevated view of the elastic member 30 showing the relative orientation of its salient features. The channel 32 is disposed uniformly about the center 42 of the elastic member, and the ridges 36a, 36b, 36c are disposed concentrically with the channel 32. The openings 34a, 34b are shown in their preferred orientation juxtaposed about the center 42 with approximately 180 degrees therebetween.

In accordance with the preferred embodiment of the present invention, the reservoir cap 18 is selectively attached to the fluid reservoir 14 such that the reservoir cap 18 prevents fluids from escaping the reservoir 14. However, since the disc portion 20 of the reservoir cap 18 defines the venting groove 24, limited amounts of fluid escape from the reservoir through the reservoir cap 18. In order to limit the loss of reservoir fluid, the elastic member 30 is placed between the reservoir cap 18 and the reservoir 14 during the fastening process, such that the teeth 28a, 28b, 28c of the inner surface 26 engage the channel 32 of the elastic membrane 30. The elastic membrane 30 is disposed such that it engages the hard stop 40 of the inner surface 26, which prevents the elastic membrane 30 from undue oscillation during a high-pressure braking event.

Consequently, reservoir fluid that passes through opening portion 16 will contact the elastic member 30. The openings 34a, 34b permit limited flow of the fluid through the elastic member 30, and the fluid that passes through the openings fills the channel 32 which serves to collect the excess fluid. As the channel 32 fills, the openings 34a, 34b permit the evacuation of the fluid. Thus, the present invention serves to limit the loss of reservoir fluid through use of multiple, radially located openings 34a, 34b instead of one centrally located opening. Any movement of the elastic member 30 relative to the inner surface 26 is inhibited by the contact between the inner surface 26 and the ridges 36a, 36b, 36c, further inhibited by the contact between the elastic membrane 30 and the hard stop 40, and further inhibited by the contact of the teeth 28a, 28b, 28c and the channel 32.

The present invention as described in its preferred embodiment thus improves the retention of reservoir fluid within the reservoir by securing an elastic member to an inner surface of a reservoir cap, and further by defining a channel with a pair of openings through which escaping fluid may be returned to the reservoir. It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

We claim:

1. A reservoir cap for a reservoir body defining an opening portion having an outer circumferential surface, the reservoir cap comprising:

a cylindrical skirt to surround the outer circumferential surface;

a disc portion formed unitarily with said cylindrical skirt, said disc portion defining an inner surface, said inner surface defining a downwardly projecting hard stop;

a first tooth formed unitarily with said disc portion and projecting downwardly from said inner surface;

an elastic member defining an upwardly opening channel extending circumferentially about an elastic member center, said channel defining a first vent slit and a second vent slit, said first vent slit and second vent slit disposed about the elastic member center;

wherein said elastic member is coupled to said inner surface such that said channel receives said tooth, and further such that said hard stop engages said elastic member.

2. The reservoir cap of claim 1 further comprising a second tooth and a third tooth, said first tooth, second tooth, and third tooth disposed uniformly in a circumferential manner about said hard stop.

3. The reservoir cap of claim 1 wherein said elastic member further defines a contact surface, and wherein said contact surface defines a plurality of annular ridges disposed uniformly about said elastic member center.

4. The reservoir cap of claim 1 further comprising an engaging member incorporated into said cylindrical skirt for engaging a surface of the reservoir body thereby selectively securing the reservoir cap to the reservoir body.

5. The reservoir cap of claim 1, wherein the channel extends downwardly from the elastic member center.

6. The reservoir cap of claim 5, wherein the first and second vent slits are formed at a downward tip of the channel.

7. The reservoir cap of claim 1, wherein the first tooth is not aligned with either of the first and second vent slits.

8. The reservoir cap of claim 1, wherein the channel and the first and second vent slits are spaced radially inwardly from an outer periphery of the elastic member.

9. The reservoir cap of claim 1, wherein the elastic member center abuts the hard stop.

10. The reservoir cap of claim 1, wherein the channel has a width that decreases as the channel extends downwardly.

11. The reservoir cap of claim 10, wherein the greatest width of the channel is larger than a width of the first tooth.

12. The reservoir cap of claim 6, wherein the greatest width of the channel is larger than a width of the first tooth, and wherein the first tooth engages the downward tip.

13. The reservoir cap of claim 1, wherein the first and second vent slits are circumferentially spaced 180°.

14. The reservoir cap of claim 1, wherein the first and second vent slits provide a fluid path between the reservoir body and a venting groove formed between the disc portion and the elastic member.

* * * * *